US 8,040,906 B2

United States Patent
Dasylva et al.

(10) Patent No.: US 8,040,906 B2
(45) Date of Patent: Oct. 18, 2011

(54) UTILIZING BETWEENNESS TO DETERMINE FORWARDING STATE IN A ROUTED NETWORK

(75) Inventors: Abel Dasylva, Gatineau (CA); Delfin Montuno, Kanata (CA); Peter Ashwood Smith, Gatineau (CA); Francois Blouin, Gatineau (CA); Tadeusz Drwiega, Kanata (CA)

(73) Assignee: Nortel Networks Limited, Mississauga, Ontario (CA)

( * ) Notice: Subject to any disclaimer, the term of this patent is extended or adjusted under 35 U.S.C. 154(b) by 295 days.

(21) Appl. No.: 12/490,187

(22) Filed: Jun. 23, 2009

(65) Prior Publication Data
US 2010/0322244 A1 Dec. 23, 2010

(51) Int. Cl.
*H04L 12/28* (2006.01)
(52) U.S. Cl. ........ 370/401; 370/256; 370/390; 370/252; 370/432
(58) Field of Classification Search .......................... None
See application file for complete search history.

(56) References Cited

U.S. PATENT DOCUMENTS

| | | | |
|---|---|---|---|
| 5,331,637 A * | 7/1994 | Francis et al. | 370/408 |
| 6,606,325 B1 | 8/2003 | Cain | |
| 2002/0150099 A1 * | 10/2002 | Pung et al. | 370/390 |
| 2003/0063614 A1 * | 4/2003 | Teig et al. | 370/401 |
| 2005/0157741 A1 * | 7/2005 | Wu et al. | 370/432 |
| 2007/0165657 A1 | 7/2007 | Smith et al. | |
| 2009/0172190 A1 * | 7/2009 | Yadav et al. | 709/241 |

FOREIGN PATENT DOCUMENTS

EP 1530327 A1 5/2005

OTHER PUBLICATIONS

Written Opinion of the International Searching Authority from corresponding PCT application PCT/CA2010/000968.

* cited by examiner

*Primary Examiner* — Duc C Ho
(74) *Attorney, Agent, or Firm* — Anderson Gorecki & Manaras LLP

(57) ABSTRACT

A set of critical nodes or links is identified on the network through which most of the shortest paths on the network occur. Each node compares their distance to end points on the network with a distance between the end points and each of the distinct critical nodes. Where the distance between the end points and the critical nodes is shorter than the distance between the end points and the node, the node is not on the shortest path and does not install forwarding state. Where the distance between the end points and the critical node is larger than or equal to the distance between the end points and the node, the node may be on the shortest path between the pair of end nodes and installs forwarding state. Installation of forwarding state may cause packet duplication, but determining forwarding state is dramatically simplified. The level of duplication may be reduced by selecting a larger number of critical nodes on the network.

24 Claims, 3 Drawing Sheets

Intermediate Node:
    If:     AB+BD>AC+CD for any critical node C
    Then:  Do not install forwarding state
    If:     AB+BD≤AC+CD for any critical node C
    Then:  Install forwarding state

US 8,040,906 B2

UTILIZING BETWEENNESS TO DETERMINE FORWARDING STATE IN A ROUTED NETWORK

TECHNICAL FIELD

The present invention relates to communication networks, and, more particularly, to a method and apparatus for using betweenness to determine forwarding state in a routed network.

BACKGROUND

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol packets, Ethernet Frames, data cells, segments, or other logical associations of bits/bytes of data, between the network elements by utilizing one or more communication links between the network elements. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how protocol data units should be handled or routed through the network by the network elements, and how information such as routing information should be exchanged between the network elements. Ethernet is one such well known networking protocol that has been defined by the Institute of Electrical and Electronics Engineers (IEEE) as standards 802.1 and 802.3.

A routing protocol such as Intermediate System to Intermediate System (IS-IS) may be run on an Ethernet network as described in application Ser. No. 11/537,775, filed Oct. 2, 2006, entitled "Provider Link State Bridging," the content of which is hereby incorporated herein by reference. In a link state protocol controlled Ethernet network, rather than utilizing a learned network view at each node by using the Spanning Tree Protocol (STP) algorithm combined with transparent bridging, the bridges forming the mesh network exchange link state advertisements to enable each node to have a synchronized view of the network topology. This is achieved via the well understood mechanism of a link state routing system. The bridges in the network have a synchronized view of the network topology, have knowledge of the requisite unicast and multicast connectivity, can compute shortest path connectivity between any pair of bridges in the network, and individually can populate their forwarding databases (FDBs) according to the computed view of the network. When all nodes have computed their role in the synchronized view and populated their FDBs, the network will have a loop-free point-to-multipoint (p2mp) multicast tree from any given bridge to the same set of peer bridges.

Calculating a full set of multicast trees for each node on the routed Ethernet mesh network is a computationally intensive process. Additionally, storing the set of multicast trees requires significant memory resources. These same considerations may exist in other types of routed networks as well, such as in an Internet Protocol (IP) based network. Accordingly, it would be advantageous to provide another way of enabling multicast forwarding state to be determined to enable implementation of multicast on a routed network.

SUMMARY

A set of critical nodes or links is identified on the network through which most of the shortest paths on the network occur. Nodes compare their distance to end points on the network with a distance between the end points and each of the critical nodes. Each node determines whether it is on a shortest path between the different pairs of nodes in the network by comparing the distance of the shortest-path through itself for each selected pair, with the distance of the shortest-path that connects the same node-pair and traverses one or more of the critical nodes, the latter path being called a "critical shortest path". Where the distance of the shortest path through itself is strictly less than or equal to the distance of the shortest of the critical shortest paths (shortest critical shortest path), the node installs forwarding state for the selected node pair, because it may be on a shortest-path. Where the distance of the shortest path through itself exceeds the distance of at least one of the critical shortest paths, the node does not install forwarding state for the selected node pair. The installation of forwarding state through this process may cause some packet duplication, but it requires dramatically less computations than the all-pairs shortest-path algorithm. The level of duplication may be minimized by selecting an adequate set of critical nodes in the network, requiring the critical nodes to calculate the real shortest path prior to installing forwarding state, or by enabling duplicate forwarding state to be pruned where duplication occurs.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
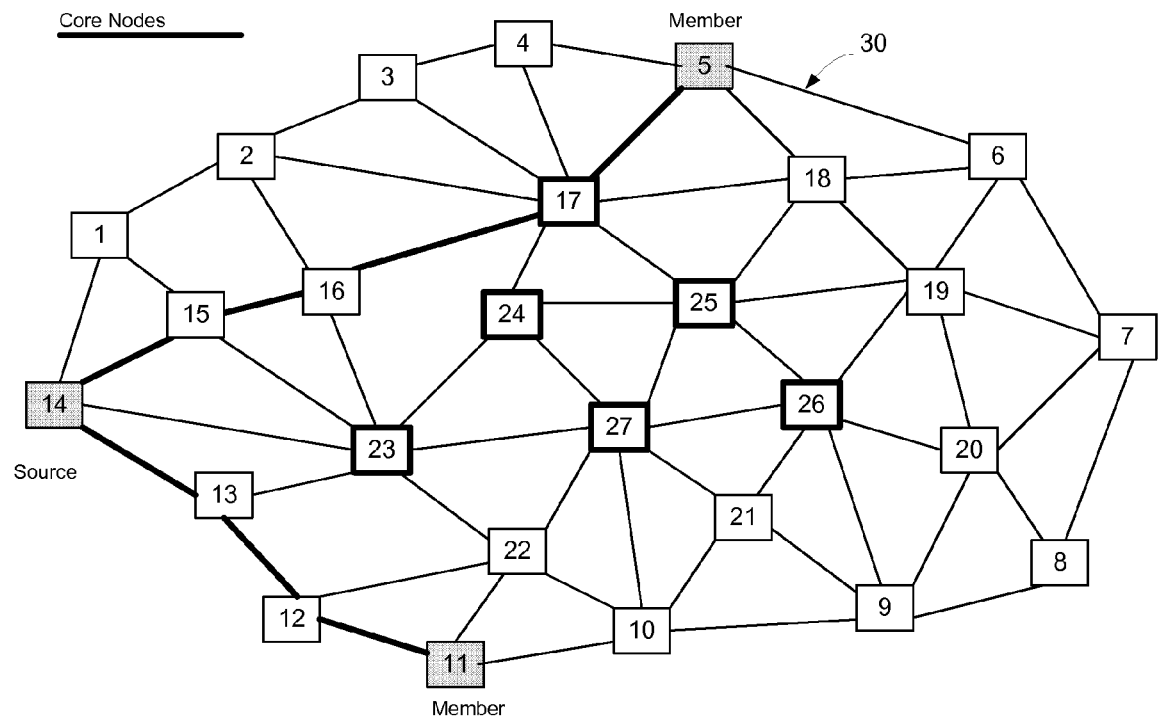
FIG. 1 is a functional block diagrams of a reference communication network showing an example selection of critical components.

FIG. 1 shows a reference routed network including a plurality of nodes numbered 1-27 interconnected by links 30. In the network of FIG. 1, it will be assumed that the nodes are running a link state routing protocol. Example link state routing protocols include Intermediate System to Intermediate System (IS-IS) and Open Shortest Path First (OSPF), although other link state routing protocols may be used as well.

In a routed network, nodes on the network may advertise interest in a multicast in a link state advertisement. The link state advertisement will be flooded on the network in a normal manner. When nodes on the network receive the link state advertisement, each node will determine whether it is on a shortest path between the multicast source and a node advertising interest in the multicast. If the node is on the shortest path, it will install forwarding state for the multicast.

Installing forwarding state in this manner requires each node to compute and store a full set of shortest path trees— one shortest path tree rooted at each node. This type of calculation is not only computationally intensive, but requires significant storage space. Accordingly, a new way of determining whether forwarding state should be installed is desirable to reduce the amount of computation required by each node, and to reduce the amount of memory required to be allocated to storing shortest path trees on the network.

According to an embodiment of the invention, a set of critical nodes is first determined on the network. For example, in FIG. 1, the set of critical nodes includes nodes 17, 23, 24, 25, 26, and 27. The manner in which the critical nodes are selected is described in greater detail below. Once the set of critical nodes has been determined, each node will use the critical nodes to determine whether to install forwarding state. Specifically, the node will determine the distance between the multicast source and the node advertising interest in the multicast for paths that pass through itself and for each of the critical nodes. A path that passes through a critical node is referred to herein as a critical shortest path. If the path that passes through itself is shorter than or equal to the shortest critical shortest path, it is possible that the node is on the shortest path and will install forwarding state for the multicast. If not, then the path that passes through the critical node is shorter. Accordingly, the node is not on the shortest path and will not install forwarding state for the multicast.

Nodes on the network can use any desirable cost metric, such as link cost, capacity, availability, reliability, etc. Likewise, link weighting may be directional if desired, and may have dependence on traffic flow directionality. Many different ways of calculating shortest paths on the network have been developed and the betweenness calculation process described herein may be used regardless of the method of calculation shortest paths on the network.

For example, in FIG. 1 assume that node 8 wanted to subscribe to a multicast from source 14. Node 8 will generate a link state advertisement indicating the membership in the multicast which will be flooded to all nodes on the network. When node 4 (for example,) receives the advertisement, it will need to know whether it should install forwarding state for the advertisement. Node 4 can calculate its shortest path to the source (node 14) as well as its shortest path to the advertising node (node 8). Node 4 can add those together to determine the cost of a path from the source to the destination that passes through it. Node 4, then calculate the shortest critical shortest path between the source node and the advertising node (node 8). If node 4 determines that the cost of the shortest critical shortest path is smaller than the cost of the shortest path through it, it does not need to install forwarding state in connection with the advertisement from node 8.

Thus, rather than having each node perform a calculation to determine if it is on the shortest path, each node looks to determine whether there is a shorter path through the network. If a node determines that there is a shorter path, then it is clear that the node is not on the shortest path. In one embodiment to reduce the amount of calculation associated with determining whether there is a shorter path, a group of critical nodes is selected and each node will compare its shortest path with the paths that pass through the critical nodes. If the path from the source to the destination through one of the critical nodes is shorter, the node will not install forwarding state for the multicast.

Continuing with this example, assume that node 8 advertised interest in the multicast and that nodes 10 and 21 are both looking to determine whether to install forwarding state for the multicast. It is possible that both nodes 10 and 21 will determine that they are on a shorter path than any of the critical nodes. Hence, both nodes may install forwarding state for the multicast. This may cause duplication such that multiple copies of the same multicast packet may be delivered to the end node. The amount of duplication will depend on the set of critical nodes selected on the network. A larger set of critical nodes will reduce duplication on the network by increasing the likelihood of finding a shorter critical shortest path between source/destination for a particular advertisement. However, a larger number of critical nodes will also require each node to compare its path length with the path through a larger number of critical nodes. Hence, increasing the number of critical nodes increases the computational complexity.

Looking once again at FIG. 1, assume that node 8 issues a link state advertisement indicating membership in the multicast associated with source 14. When node 20 receives this link state advertisement, it will compute its shortest distance to the source node which, in this example, will be assumed to be a route that passes through nodes 23, 27, and 26. Node 20 will also compute its shortest path to advertising node 8 which is direct.

Node 20 will then compare the shortest path between source 14 and advertising node 8 via each of the critical nodes. In this example, it will be assumed that the path that passes through node 26 will also be via nodes 23 and 27, and that the shortest path through critical node 26 passes through node 20. In this example, the shortest path via node 26 is the same cost as the shortest path that passes through node 20, since the two paths are congruent on the network. Hence, node 20 calculates that its shortest path between the source and destination has a cost that is equal to the shortest critical shortest path, and thus node 20 should install forwarding state for the multicast.

By configuring the intermediate nodes to install forwarding state if they are on an equally short path through the network as a shortest critical shortest path, the nodes are assured to install forwarding state where their calculated shortest path also happens to pass through a critical node.

FIG. 1 shows an example set of critical nodes that has been selected on the reference network. Note, that the set of critical nodes is always less than the total number of nodes on the network, and preferably is significantly less than the total number of nodes on the network. As noted above, the larger the set of critical nodes, the more processing each node will need to implement to determine whether there is a shorter path via one of the critical nodes—larger numbers of critical nodes means more paths through the network to be compared against the path through the intermediate node. However, a larger number of critical nodes will decrease the likelihood of having duplicate forwarding state installed for a particular multicast via multiple paths through the network.

There may be many different ways of determining a set of critical nodes on the network, since the overall goal of selecting nodes as critical nodes is to select a set of nodes that generally provide shorter paths through the network between a majority of the source/destination combinations. For example, the critical nodes may be administratively determined and signaled on the network. Alternatively, the critical nodes may be determined by determining which nodes on the network handle a majority of the shortest paths between pairs of nodes on the network. This may be done by calculating shortest paths between all of the edge nodes and looking to determine which nodes handle the largest numbers of these shortest paths. Other ways of determining nodes that handle a large proportion of traffic on the network may be determined as well. For example, node capability and link capacity and their respective costs may also be considered in the selection process.

In one embodiment, a set of critical nodes is identified based on the number of shorts-paths that go through them across all node pairs. A selection criterion may be that a fraction exceeding a set ratio of node-pairs must have a shortest-path going through a node for it to be critical. There are many ways of determining the critical nodes on the network.

Once the set of critical nodes has been determined, each node on the network will calculate and store a shortest path distance between each critical node and each other node on the network. This reduces the amount of shortest path trees the node must compute and store from the total number of nodes on the network to only the critical nodes on the network. Thus, for example, if there are 100 nodes on the network and 10 nodes have been deemed to be critical nodes, each node on the network will only be required to calculate and store shortest paths from each of the critical nodes to each of the other nodes rather than calculating and storing shortest path trees from each of the 100 nodes on the network. In this example, this would reduce the processing and storage requirements approximately by a factor of ten.

Each node will also calculate the shortest distance from it to each other node on the network. When a node receives a link state advertisement containing multicast membership information, it will need to determine whether it should install forwarding state for the multicast, so that multicast packets may be forwarded to the advertising node. For example, in FIG. 1, if node 14 is the multicast source, and nodes 11 and 5 advertise interest in the multicast to be included in the multicast, the other nodes on the network will need to know whether they should install forwarding state for the multicast to forward multicast data toward the member nodes. Ideally, the nodes should only install forwarding state if they are on the shortest path between the multicast source and a node advertising interest in the multicast. In FIG. 1, the shortest paths are shown by dark lines. Conventionally this was accomplished by having each node calculate a shortest path tree rooted at every other node on the network. The node would then use the trees to determine whether it was on a shortest path for the multicast. If the node was on the shortest path it would install forwarding state for the multicast. If not, the node would not install forwarding state for the multicast.

According to an embodiment of the invention, however, rather than looking to determine if a node is on a shortest path, the node instead looks to see whether any of the critical nodes represent a shorter path. If none of the critical nodes are on a shorter path, then the node will install forwarding state for the multicast.

Figure 2:
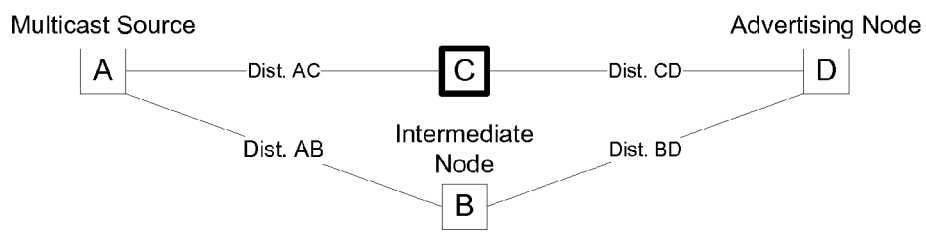
FIG. 2 is a flow diagram of a method of pre-computing alternate forwarding state according to an embodiment of the invention.

FIG. 2 shows another way of determining whether a node should install forwarding state. Specifically, as noted above, each node on the network will calculate a set of shortest path trees from each of the critical nodes to each other node on the network. The node will also determine a shortest path tree rooted at itself to every other node on the network. Calculation of these trees may be implemented using a well known process such as, e.g. Dijkstra.

In FIG. 2, the multicast source is node A and the node advertising interest in the multicast is node D. When an intermediate node (node B) receives a link state advertisement from advertising node D, it will use the shortest path tree rooted at itself to determine the distance between itself and the advertising node (Distance BD), as well as the distance between itself and the multicast source (Distance AB). The total distance between the multicast source and the advertising node that passes through the intermediate node is thus AB+BD.

The intermediate node will also determine the critical shortest path for each critical node ($C_i$), e.g. by adding the distance between the advertising node and the critical node (Distance $AC_i$) and the distance between the critical node and the multicast source (Distance $DC_i$). The intermediate node will add these values together to determine the distance, or cost, of the critical shortest path between the multicast source and advertising node that passes through the critical node $C_i$. For simplicity in FIG. 2 only one critical node has been illustrated, and designated as node C. Hence, the distance from the multicast source A to the critical node is Distance AC, and the distance from the critical node to the advertising node is Distance CD. The total distance of the critical shortest path between the multicast source and the advertising node that passes through the critical node C is AC+CD.

The intermediate node will then compare the calculated distance between the multicast source and the advertising node on the path that passes through it (AB+BD) with each of the paths that go through each of the critical nodes ($AC_i$+$BC_i$). Since only one critical node has been shown in FIG. 2, the intermediate node will compare Distance AB+BD with Distance AC+CD.

If the path between the multicast source and the advertising node that passes through the intermediate node is longer than any of the critical shortest paths through any of the critical nodes, then the intermediate node is not on the shortest path between the multicast source and the advertising node. Stated differently, if intermediate node finds a shorter path through one of the critical nodes, it is not on the shortest path and should not install forwarding state. Hence, the node may safely ignore the link state advertisement and not install forwarding state for the multicast. Stated differently, if AB+BD>AC+CD, then the intermediate node B is not on the shortest path between nodes A and D, and intermediate node B should not install forwarding state. This is true if the path through the intermediate node B is longer than any one of the critical shortest paths through any one of the critical nodes C. Thus, once intermediate node B finds any at least one critical shortest path that is shorter than its between the multicast source and destination, it may stop processing.

Conversely, if the path through the intermediate node is shorter than or equal to the shortest critical shortest path between the multicast source and the advertising node and which pass through at least one of the critical nodes, then the intermediate node is likely to be on the shortest path between the multicast source and the advertising node. Stated differently, if AB+BD≦AC+CD for each critical node C, then B is likely to be on the shortest path between nodes A and D. In this instance, intermediate node will install forwarding state for the multicast so that any multicast packet received by the node will be replicated out a port to be forwarded over the network toward the advertising node.

Figure 3:
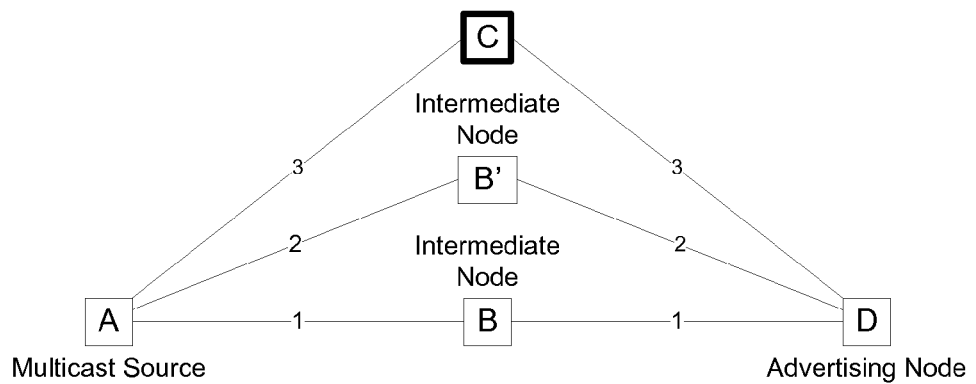
FIG. 3 is a flow diagram of a method of using pre-computed alternate forwarding state according to an embodiment of the invention.

Note, in this regard, that intermediate node B is not assured that it is on the shortest path between the multicast source A and the advertising node D. Rather, it has calculated that it is likely to be on the shortest path. Thus, it is possible that there will be some duplication of multicast forwarding state on the network. FIG. 3 shows this scenario. Specifically, in FIG. 3 assume that the numbers on the links represent the calculated distance between the various nodes. In this instance, intermediate node B will calculate the distance between multicast source A and advertising node D that passes through it to be equal to 2 (Distance AB+BD=1+1=2). Intermediate node B will also calculate that the distance between the multicast source A and advertising node D that passes through the critical node C to be 6 (Distance AC+CD=3+3=6). Accordingly, intermediate node B will determine that it should install forwarding state for the multicast.

Similarly, intermediate node B' will calculate the distance between multicast source A and advertising node D that passes through it to be equal to 4 (Distance AB'+B'D=2+2=4) and will calculate that the distance between the multicast source A and advertising node D that passes through the critical node C to be 6 (Distance AC+CD=3+3=6). Accordingly, intermediate node B' will determine that it too should install forwarding state for the multicast. Thus, calculating whether to install forwarding state based on a comparison with paths that pass through the critical nodes may result in a duplication of multicast forwarding state on the network.

The proportion of multicast traffic that is duplicated may be traded off against selection of a larger set of critical nodes. Specifically, as noted above, the set of critical nodes, in one embodiment, is based on a determination that the particular set of nodes handles a particular percentage of shortest paths on the network. For example, a set of critical nodes may be determined which collectively are on 90% of the shortest paths through the network. By adjusting the selection of critical nodes, the percentage of shortest paths that are included in the set of critical nodes may be adjusted to thereby adjust the amount of traffic duplication.

Specifically, as the set of critical nodes handles a larger percentage of the shortest paths through the network, it becomes increasingly unlikely that two nodes will determine that they are both on shorter paths through the network between the source and advertising node than the shortest critical shortest path. Stated differently, as the percentage of shortest paths handled by the set of critical nodes increases, the scenario illustrated by FIG. 3 becomes increasingly uncommon and, hence, the amount of duplication of multicast traffic that occurs on the network will be reduced.

However, increasing the number of critical nodes increases the number of shortest path trees that each intermediate node must calculate and store. Note, as mentioned above, each intermediate node will calculate a shortest path tree from itself to each other node on the network and will also calculate a shortest path tree from each of the critical nodes to each of the other nodes on the network. Thus, as the number of critical nodes increases, the amount of processing requirements and the concomitant storage requirements at each of the intermediate nodes increases. Accordingly, there is a trade-off between computational complexity and packet duplication that may be adjusted by proper selection of critical nodes.

Loop avoidance is very important in a multicast context and, according to an embodiment of the invention, the nodes implement a loop avoidance function to prevent the formation of loops in connection with installation of forwarding state. In Provider Link State Bridging (PLSB), loop avoidance may be implemented using Reverse Path Forwarding Check (RPFC) which ensures that packets arrive at a correct interface before being forwarded on the network. RPFC may also be used to remove duplicate flows of packets from the network to reduce the amount of duplication occurring on the network.

Figure 4:
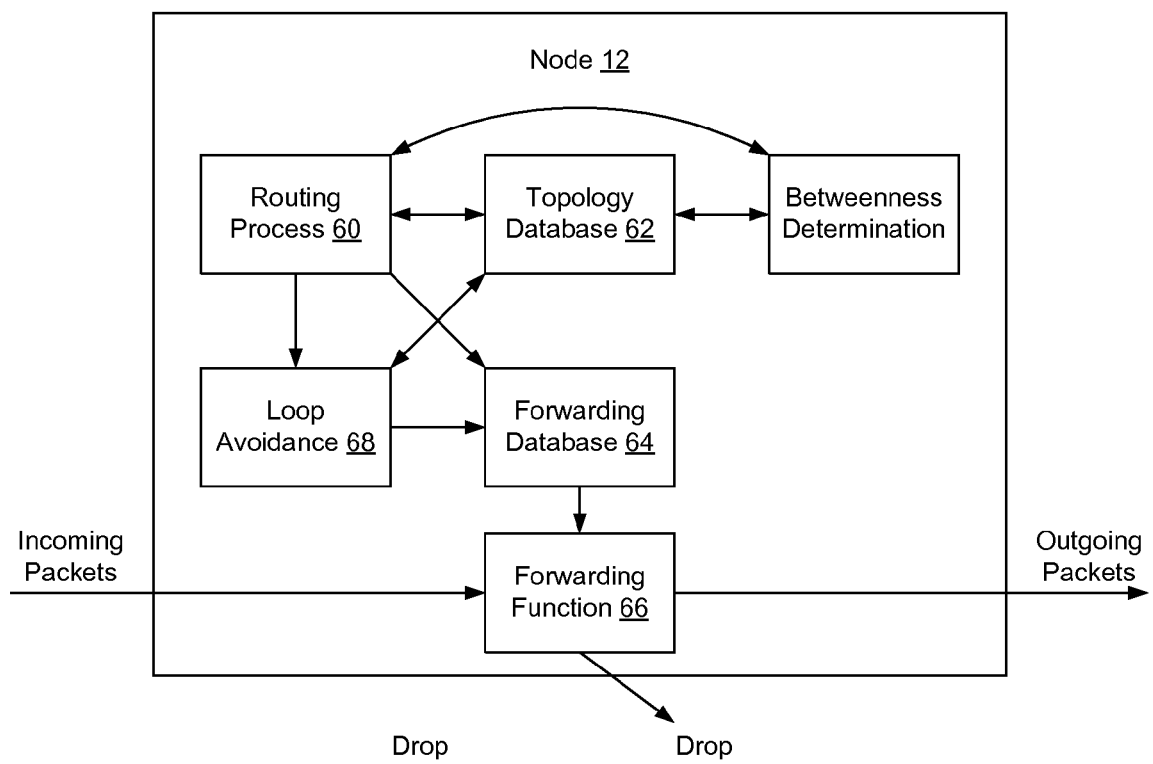
FIG. 4 is a functional block diagram of an example node that may be used to pre-compute alternate forwarding state in a routed network according to an embodiment of the invention.

FIG. 4 shows an example node 12 that may be used to implement an embodiment of the invention. As shown in FIG. 4, the node includes a routing process 60 that exchanges link state protocol messages with other nodes on the network to build a network topology database 62. The routing process 60 uses the topology maintained in the topology database to calculate shortest path trees through the network and calculate forwarding state to be used by the node to forward data on the network. The node will selectively install forwarding state to implement the shortest path trees in its forwarding database 64 which may be used by a forwarding function 66 to selectively forward packets on the multicast tree.

As noted above, loop prevention is very important in a multicast context and, according to an embodiment of the invention, the node 12 includes a loop avoidance function 68 to implement the loop avoidance process discussed herein. The loop avoidance function may implement a RPFC process and may also work with the topology database and routing process to ensure transient loops do not form in connection with topology changes on the network.

The node 12 also implements a betweenness process, described in greater detail above in connection with FIGS. 1-3, which enables the node to determine whether there is a shorter path between the source and destination that passes through one of the critical nodes. If no such shorter path exists, the betweenness process determines that the node is likely between the source and destination and can cause the routing process 60 to install forwarding state for the multicast in the forwarding database 64. The betweenness process uses the shortest path trees calculated by the routing system for the node and for each of the critical nodes to determine whether the path that flows through the node is shorter than the shortest critical shortest path. If so, the betweenness process will instruct the routing process to install forwarding state for the multicast. Although a separate betweenness process has been illustrated as implementing this aspect of the invention, the invention is not limited in this manner as the routing process itself may be adjusted to perform this function as well.

Figure 5:
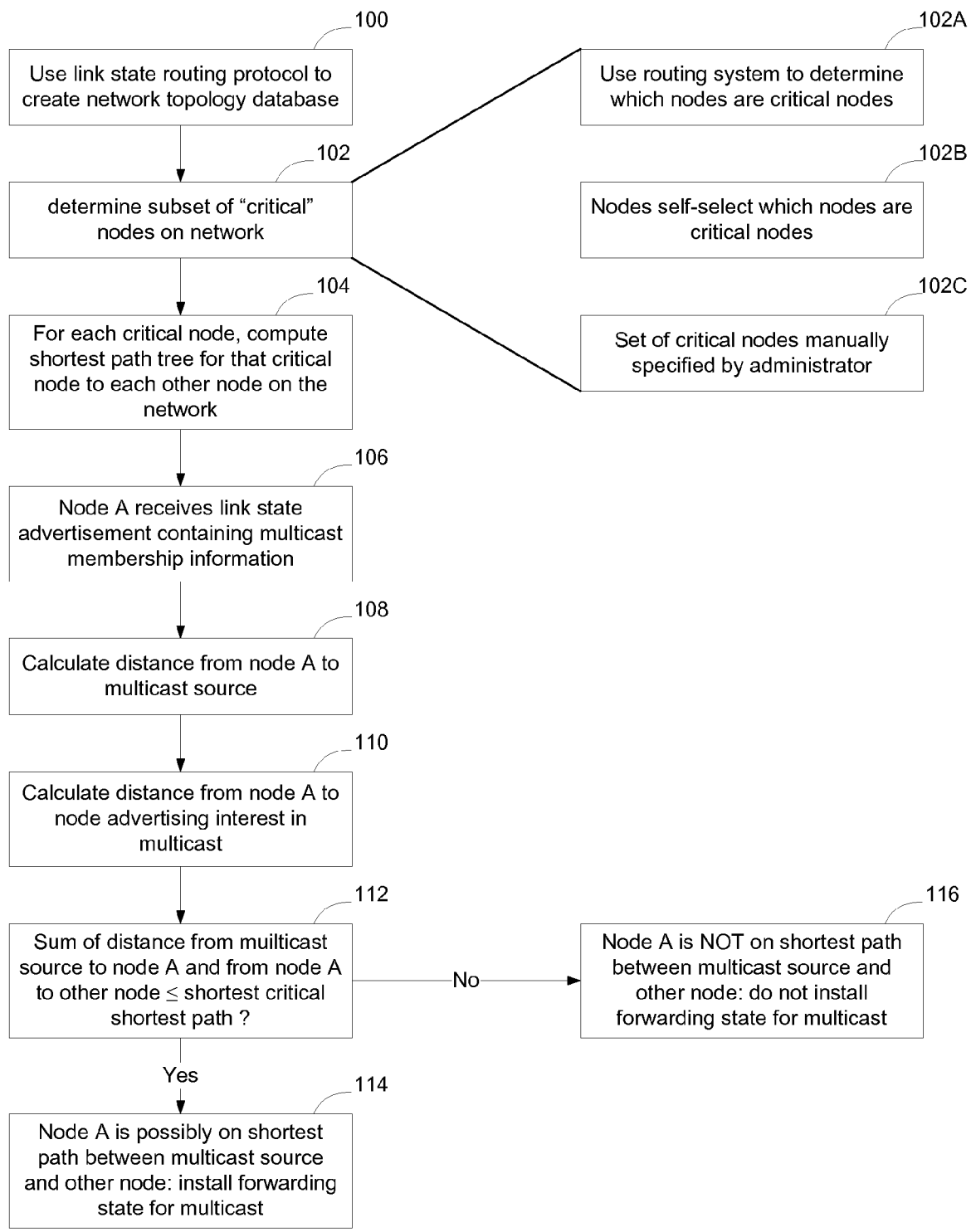
FIG. 5 is a process that may be implemented by a node on a routed network to selectively install multicast forwarding state.

FIG. 5 shows a process that may be implemented by a node on a routed network to selectively install multicast forwarding state. As shown in FIG. 5, the nodes on the network will exchange link state advertisements to learn network topology. The network topology is stored in a network topology database (100). Each node will then determine a subset of critical nodes on the network (102). The nodes may each use their routing system to determine which nodes are critical nodes (102A) the nodes may self-select which are to be critical nodes (102B) or a set of critical nodes may be administratively determined (102C).

Each node on the network will compute a shortest path tree for each critical node to each other node on the network, and will also compute a shortest path tree from it to each other node on the network (104). When an intermediate node, node A, receives a link state advertisement containing multicast membership information (106), the intermediate node will use the pre-calculated shortest path tree rooted at itself to determine a distance from itself to the multicast source (108) and to determine a distance to the advertising node (110). The sum of the distance from the multicast source to the intermediate node and the distance from the advertising node to the intermediate node will be compared with the cost of paths passing through each of the critical nodes (112). If the cost of the path passing through the intermediate node is shorter than or equal to each of the paths passing through the critical nodes, then the node is likely to be on the shortest path between the source and destination and it should install forwarding state for the multicast (114). If not, it should not. (116).

Critical nodes will process advertisements the same way as any other intermediate node. Specifically, when a critical node receives a link state advertisement, it will calculate its shortest cost path between the source and destination and will calculate the critical shortest paths for each of the other critical nodes. If its cost is the same as or less than the shortest critical shortest path through one of the other critical nodes, the critical node will install forwarding state for the multicast. This will assure that at least one of the critical nodes installs forwarding state for the multicast so that the critical node with the shortest path between the source and destination will always install forwarding state for the multicast.

If the destination node starts to receive multiple copies of the multicast, the destination node can prune itself from the multicast tree by sending a prune message to the critical node to enable the critical node to remove forwarding state. In this way a destination node is guaranteed to be included in the multicast while enabling the possibility that paths through the network may be pruned at a later time to reduce duplication of multicast traffic on the network.

As another alternative, the critical node that is determined to be on the shortest critical shortest path (amongst other critical nodes), may determine whether there is a shorter path through the network between the source and destination that does not pass through one of the critical nodes. If so, the nodes on the shorter path should calculate that they are on that shorter path and will install forwarding state for the multicast. Hence, if the critical node on the shortest critical shortest path (shortest path through one of the critical nodes) determines that there is a shorter path through the network, the critical node does not need to install forwarding state for the multicast. Conversely, if the critical node does not find a shorter path, then it knows that it is on a shortest path and will install forwarding state for the multicast. This also enables the critical nodes to minimize duplication of traffic, since the critical nodes in this embodiment will not install duplicate forwarding state where they compute that there is another shortest path through the network. In this embodiment, the critical nodes perform a standard shortest path calculation to determine whether to install forwarding state, while the other non-critical nodes on the network may perform the simplified betweenness calculation described herein without performing a full shortest path calculation and, hence, without computing and storing a full set of shortest path trees from each source to each destination.

Although an embodiment has been described in which nodes determined whether to install multicast forwarding state by performing betweenness calculations, the same process may also be used to install unicast forwarding state.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of installing multicast forwarding state at a node of a routed network, the method comprising the steps of:
    receiving, by the node, a link state advertisement containing an indication that a multicast destination would like to join a multicast;
    determining a cost of a shortest path from a multicast source to the multicast destination that passes through the node;
    determining costs of critical shortest paths from the multicast source to the multicast destination that pass through critical nodes on the network to look for a shorter critical shortest path through the network; and
    installing forwarding state for the multicast, by the node, only if the cost of the shortest path from the multicast source to the multicast destination that passes through the node is less than or equal to the shortest critical shortest path through the network between the multicast source and multicast destination via one of the critical nodes.

2. The method of claim 1, wherein the step of determining the cost of the path from the multicast source to the multicast destination comprises determining a first cost of a first path from the node to the multicast source, determining a second cost of a second path from the node to the multicast destination, and summing the first cost of the first path with the second cost of the second path.

3. The method of claim 2, further comprising the step of pre-computing a shortest path tree from the node to each other node on the network, and using the pre-computed shortest path tree to determine the first cost of the first path and the second cost of the second path.

4. The method of claim 1, wherein the step of determining costs of paths from the multicast source to the multicast destination that pass through critical nodes on the network comprises determining, for each such critical node, a first cost of a first path from the critical node to the multicast source, determining a second cost of a second path from the critical node to the multicast destination, and summing the first cost of the first path with the second cost of the second path to determine the critical shortest path for that critical node.

5. The method of claim 4, further comprising the step of pre-computing and storing shortest path trees from each critical node to each other node on the network, and using the pre-computed shortest path trees to determine the first cost of the first path and the second cost of the second path for each critical node.

6. The method of claim 1, wherein the step of determining costs of critical shortest paths between the multicast source and multicast destination that pass through critical nodes on the network is terminated once the node has found a critical shortest path that is shorter than its path between the multicast source and multicast destination.

7. The method of claim 1, wherein the critical nodes are selected administratively and advertised on the network.

8. The method of claim 1, wherein the critical nodes are selected to be a small number of nodes that handles a large percentage of shortest paths between pairs of nodes on the network.

9. The method of claim 1, wherein the set of critical nodes are self-selected by the nodes on the network.

10. The method of claim 1, wherein the set of critical nodes is a subset of the nodes on the network.

11. The method of claim 10, wherein the set of critical nodes is less than 10% of the nodes on the network.

12. The method of claim 1, wherein the shortest path is based on a cost metric selected from cost, capacity, availability, and reliability.

13. The method of claim 12, wherein the shortest path calculation uses link weights that are directionally dependent.

14. The method of claim 1, wherein installing forwarding state for the multicast, by the node, only if the cost of the shortest path from the multicast source to the multicast destination that passes through the node is less than or equal to the shortest critical shortest path through the network between the multicast source and multicast destination via one of the critical nodes causes duplicate forwarding state to be installed on the network.

15. The method of claim 14, further comprising the step of pruning the duplicate forwarding state from the network.

16. The method of claim 1, wherein the step of installing forwarding state for the multicast is performed, by the node, only if the cost of the shortest path from the multicast source to the multicast destination that passes through the node is less than or equal to the shortest critical shortest path through one of the critical nodes.

17. The method of claim 1, wherein the node is a critical node.

18. The method of claim 1, wherein the node is an intermediate node other than a critical node.

19. A routed network, comprising
a plurality of nodes interconnected by links, each of the nodes running a link state routing protocol to enable shortest path forwarding to be implemented on the network, a first set of the plurality of nodes being designated as critical nodes and a remainder of the plurality of nodes being non-critical nodes;
each of the nodes being configured to install forwarding state for a source/destination pair by comparing its betweenness for the source/destination pair with a betweenness for the source/destination pair of each of the critical nodes.

20. The network of claim 19, wherein the critical nodes are selected by looking for nodes on the routed network that are on shortest paths between the most source/destination pairs.

21. The network of claim 19, wherein a number of critical nodes is selected to minimize both computational complexity and traffic duplication.

22. The network of claim 19, wherein betweenness for a node is calculated by looking at a path distance between the source/destination pair that passes through the node.

23. The network of claim 19, wherein the forwarding state is multicast forwarding state.

24. The network of claim 19, wherein the network will install at least one forwarding path between each source/destination pair in connection with implementation of a betweenness calculation for the source/destination pair.

* * * * *

UNITED STATES PATENT AND TRADEMARK OFFICE
CERTIFICATE OF CORRECTION

PATENT NO.        : 8,040,906 B2
APPLICATION NO.   : 12/490187
DATED             : October 18, 2011
INVENTOR(S)       : Abel Dasylva et al.

Page 1 of 1

It is certified that error appears in the above-identified patent and that said Letters Patent is hereby corrected as shown below:

Column 12, lines 8-12, Claim 19,

"each of the nodes being configured to install forwarding state for a source/destination pair by comparing its betweeness for the source/destination pair with a betweeness for the source/destination pair of each of the critical nodes.".

should read:

--each of the non-critical nodes being configured to install forwarding state for a multicast between a multicast source and a multicast destination only if a cost of a shortest path for the multicast source/destination pair that passes through the non-critical node is less than or equal to a shortest critical shortest path for the multicast source/destination pair via one of the critical nodes.--.

Signed and Sealed this
Tenth Day of January, 2012

David J. Kappos
*Director of the United States Patent and Trademark Office*